Aug. 14, 1962   S. J. KLIMA ET AL   3,049,464
PROCESS OF MANUFACTURING METALIZED PLASTIC MICROWAVE LENS
Filed Nov. 28, 1956   7 Sheets-Sheet 1

INVENTORS
S. J. KLIMA
F. E. NIECHNIEDOWICZ
BY
ATTORNEY

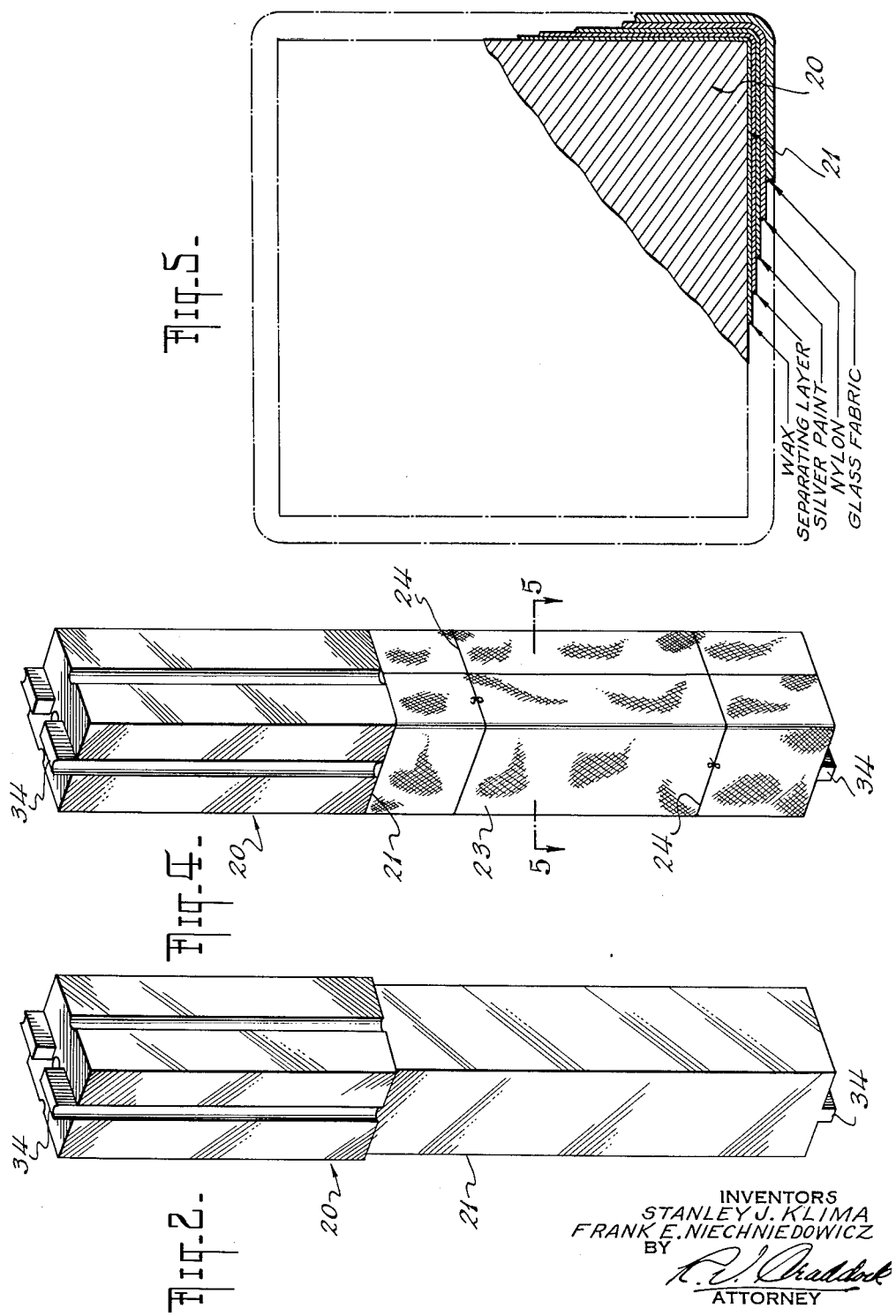

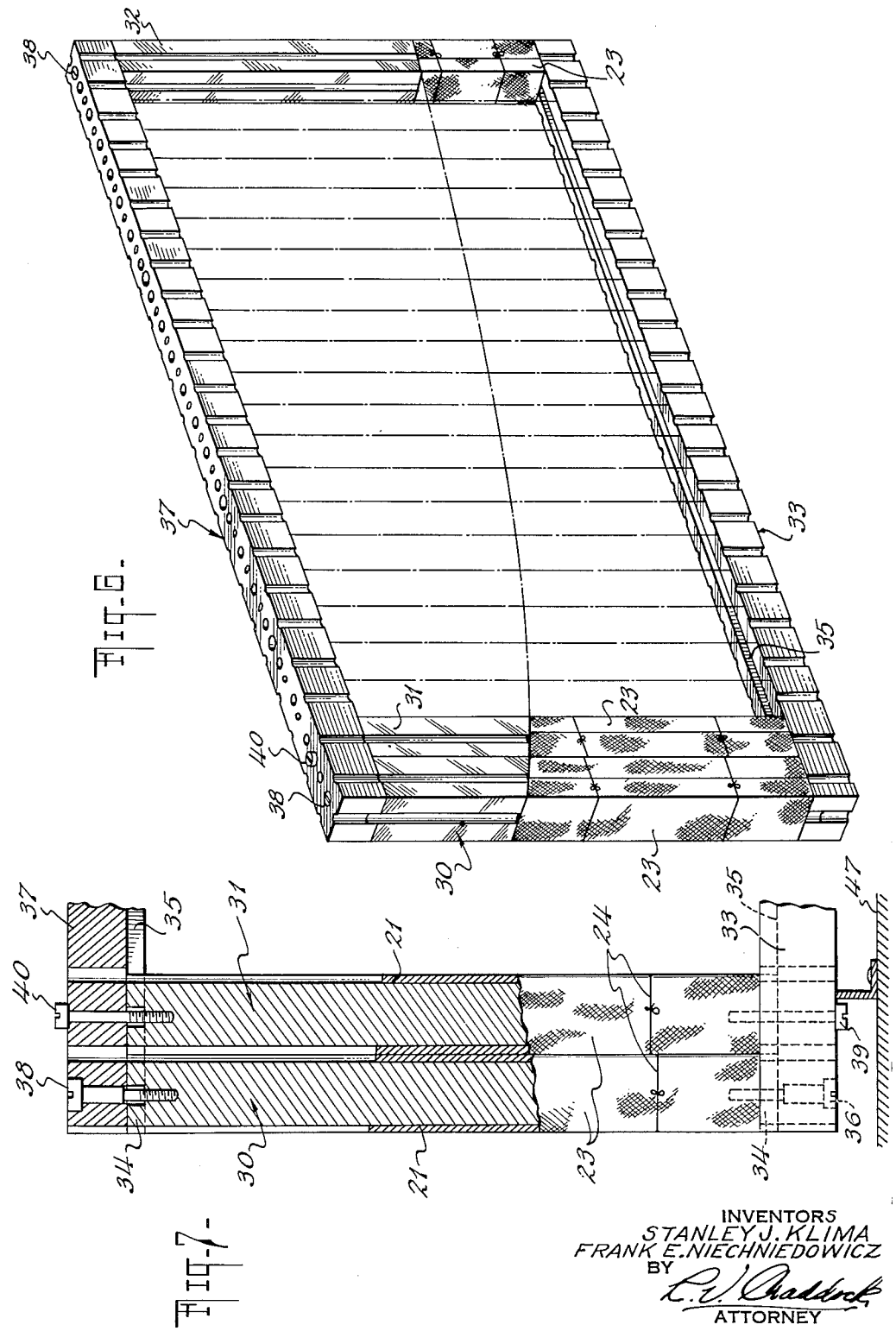

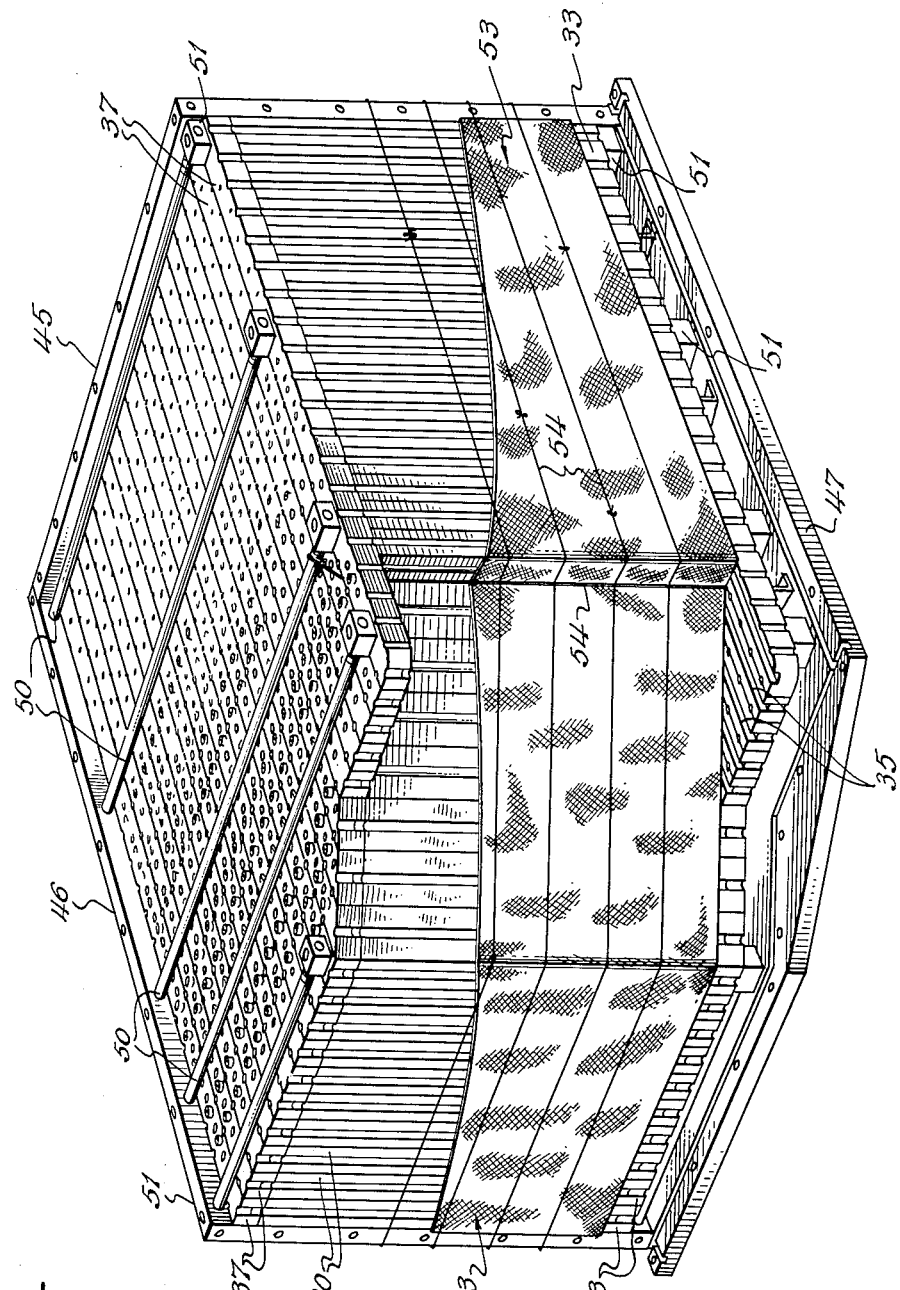

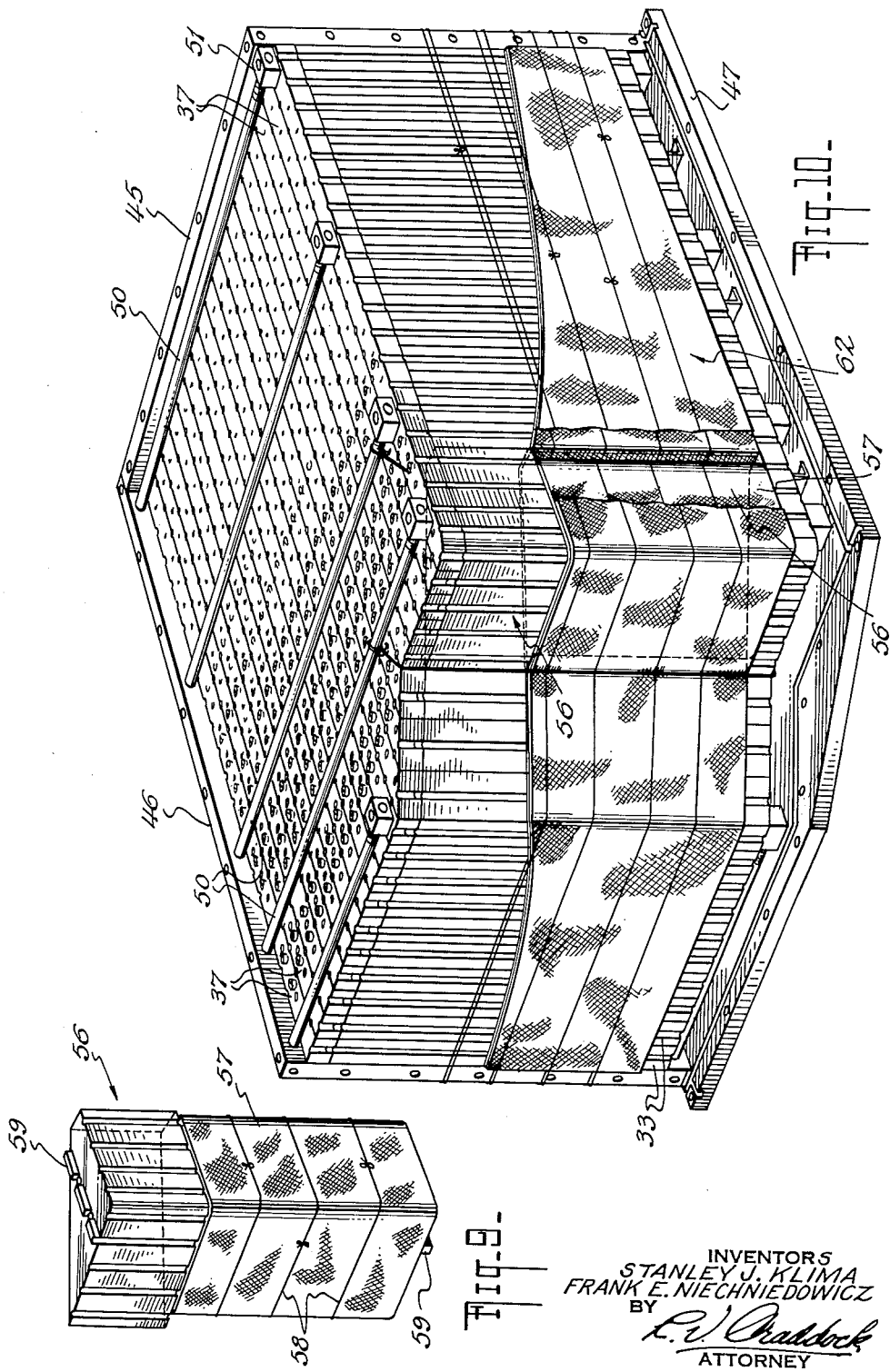

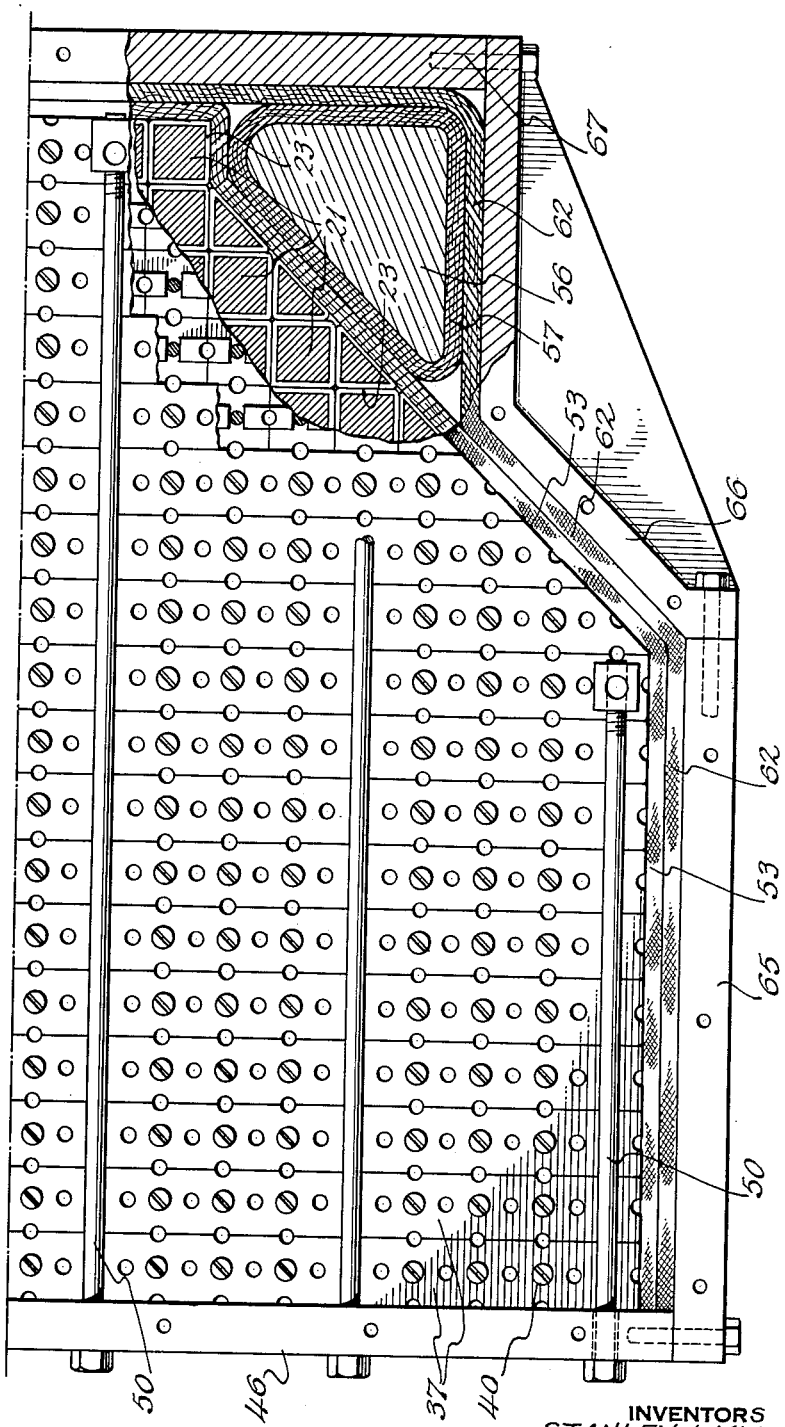

United States Patent Office 3,049,464
Patented Aug. 14, 1962

3,049,464
PROCESS OF MANUFACTURING METALIZED
PLASTIC MICROWAVE LENS
Stanley J. Klima, Elmhurst, and Frank E. Niechniedowicz, Brooklyn, N.Y., assignors to Sperry Rand Corporation, Great Neck, N.Y., a corporation of Delaware
Filed Nov. 28, 1956, Ser. No. 624,880
2 Claims. (Cl. 156—245)

This invention relates to the production of hollow plastic microware devices having interior conductive surfaces and more particularly to a method for producing metallized reinforced plastic microwave lenses.

In the field of microwaves it is desirable to provide plastic wave guiding structures and plastic multicellular lenses. Such devices must have metallized coatings electrically conductive to microwaves on the interior surfaces of hollow plastic rigid or flexible tubes of rectangular or circular cross section. To be electrically conductive to microwaves, the metallic coatings must be of a metal having maximum conductivity and must be smooth, continuous, homogeneous, and free of irregularities and voids.

In prior art techniques for obtaining conductive coatings inside hollow tubes, the tubular plastic structure was cast or formed as the first step. The conductive coating was then applied to the interior surfaces of the plastic structure by metal spraying, vacuum deposition, electroplating, chemical precipitation, etc. Applying the metal coating to the interior surfaces was slow, difficult to control, and failed to achieve the desired conductive properties for microwaves. Furthermore, the coatings had little resistance to abrasion and wear. A method was required which was rapid, adapted to mass production techniques, and yet produced the desired conductive properties in the metallic coating.

Microwave lenses comprise a multiplicity of rectangular or square hollow thin-walled tubes, the interior surfaces of each tube being conductive to microwaves. The tubes are assembled parallel and adjacent to each other into a compact unit resembling a honeycomb structure. The lens serves to focus or collimate electromagnetic energy passing through its multiplicity of tubes.

In prior art multicellular lenses, the tubes were fabricated from sheets of conductive metal, such as brass, copper, or aluminum. Each cell had to be individually formed, and the plurality of cells assembled to form the lens. However, it was necessary not only that the individual cell structures be uniform, but that the common walls between the cells be of uniform thickness. Consequently, the formation of the individual cells and the process of assembling them had to be performed in a slow and painstaking manner to insure the requisite dimensions and tolerances. Furthermore, to be electrically conductive to microwaves the interior metallic surfaces had to be extremely smooth and homogeneous. A method of producing a multicellular lens was required which was rapid, adapted to mass production techniques, and yet yielded a lens having high dimensional accuracy and having the desired microwave properties.

It is therefore the principal object of this invention to produce a conductive coating on the interior surfaces of hollow plastic structures.

It is a further object of this invention to provide a process for the production of a silver coating conductive to microwaves on the interior surfaces of hollow plastic structures.

It is a further object of this invention to provide a metallized film on the surface of a plastic structure.

It is a further object of this invention to provide a reinforced hollow plastic structure, the interior surfaces thereof being conductive to microwaves.

It is a further object of this invention to provide a multicellular microwave lens of reinforced plastic molding material.

These objects are realized in this invention by forming metallic films comprising thin metallic flakes in a suitable binder on the exterior smooth surfaces of a plurality of mandrels, the exterior dimensions of the mandrels corresponding to the interior dimensions of the individual cells of the lens. By proper selection of their sizes and shapes, the flat surfaces of the metallic flakes will be aligned substantially parallel with the adjacent surfaces of the mandrels thereby forming continuous conductive films conformal with the surfaces of the respective mandrels. A thin layer of plastic molding material is then sprayed or brushed over the conductive films on each mandrel. As the binder of the metallic film includes a constituent not readily soluble in the molding material, the metallic flakes are maintained in alignment during the spraying or brushing step. The hardened molding material then adheres tightly to the adjacent film. The mandrels are next wrapped with layers of fine mesh nylon cloth to preserve the smooth surface of the conductive film, followed by layers of relatively coarse mesh glass fabric for strength. The mandrels are then assembled and aligned parallel and adjacent to each other by employing guide rails. A mold box is constructed about the assembly of mandrels. The interior shape of the mandrel box corresponds to the desired exterior shape of the lens. The box is evacuated and the interior of the mold box, including the spaces between the adjacent mandrel walls, is filled with additional plastic molding material. After this molding material has hardened the mandrels may be removed from the completed structure. A metallic film adheres as a conductive surface to the interior of each plastic tube in the composite structure. The resultant lens is sturdy because of the glass fiber reinforced structure, is dimensionally precise due to the accurate mold which may be employed, and is conductive to microwaves because of the metallic film inside each lens element.

The present invention will now be described with reference to the following drawings, wherein:

FIG. 2 is a drawing in perspective of a typical mandrel employed for molding the lens;

FIG. 4 is a drawing in perspective of the mandrel of FIG. 2 wherein glass fabric has been wound about the undercut portion;

FIG. 5 is a cross section on line 5—5 of FIG. 4, showing a mandrel immediately before it is assembled into the mold box;

FIG. 6 is a drawing in perspective showing details of the assembly of the mandrels;

FIG. 7 is a sectional view of a portion of the assembly of FIG. 6;

FIG. 8 is a drawing in perspective showing details of the mold assembly;

FIG. 9 is a drawing in perspective of the corner mandrel of the mold assembly;

FIG. 10 is a drawing in perspective showing further details of the mold assembly;

FIG. 11 is a plan view, partly in section, of the mold assembly of FIG. 10; and

Figure 1:
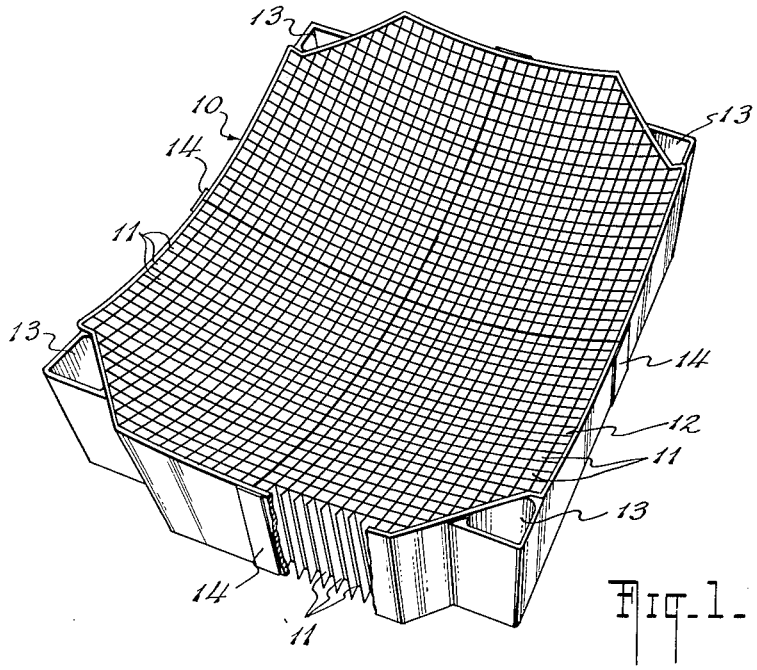
FIG. 1 is a perspective drawing, partly in section, of a microwave lens fabricated according to the method of this invention.

Among the materials employed in this process are a suspension of metallic flakes in a binding vehicle, and the fluid plastic molding material. The metallic flakes should be relatively thin and of conductive materials such as silver, copper, gold, aluminum, or alloys of silver and of gold, etc., to obtain a conductive film. The binder must include a constituent substantially insoluble in the molding material. The molding material may be any resinous material; for example, epoxy resin or polyester resin. Where the molding material is epoxy resin, the binder may be nitrocellulose. The epoxy resin, being naturally adhesive, bonds to the resulting metallic film without substantially attacking the nitrocellulose binder. On the other hand, if the molding material is polyester resin, a substance not naturally adhesive, the binder must contain in addition to a constituent not readily dissolved by the polyester resin a substance soluble in the molding material. This effects a mechanical bond between the hardened molding material and the metallic film. For example, the binder may contain a mixture of nitrocellulose, a substance called the primary binder since it is insoluble in the polyester resin molding material, and cellulose acetate butyrate, a substance called the secondary binder since it is readily soluble in the polyester resin. A binder of the latter type is described and claimed in U.S. patent application Serial No. 619,950, filed November 2, 1956, by Warren D. Williams, and assigned to the same assignee as the instant invention.

As presently understood the method by which a conductive metallic film is originally obtained and retained despite its immersion in the molding material is as follows: The metallic particles are thin flakes of critical size and thickness. When they are deposited on the smooth surfaces of the mandrel, either by brushing, spraying, electrostatic precipitation, etc., the forces given the particles tend to orient them so that their flat surfaces are substantially in parallel alignment with the adjacent mandrel surfaces. The presence of a profusion of such particles in the original suspension causes an overlapping of the particles, all aligned substantially parallel to the adjacent mandrel surfaces. A thin continuous conductive film is thus formed and retained in place as the binding material hardens. Any particle which originally was not deposited substantially parallel to the mandrel surface is in a state of unstable equilibrium, so that as the binder hardens surface tension will force the particle to fall over and assume a position parallel to the mandrel surface.

When the film is immersed in the molding material as by spraying, dipping, molding, brushing, etc., the silver particles would tend to become disarranged and assume random attitudes with respect to the mandrel surfaces were it not for the fact that the binder contains a constituent substantially insoluble in the molding material. This insoluble binding material maintains the conductive film intact as the molding material sets. Where the molding material is epoxy resin, the natural adhesiveness of the epoxy causes the molding material to tightly adhere to the metallic film. Where the molding material is polyester resin, the styrene therein dissolves the secondary binder so that when the resin polymerizes an intimate mechanical bond has been established between the conductive film and the hardened molding material. In both instances the bond between the molding material and the metallic film is greater than that between the film and the mandrel, so that the mandrel may be removed to leave a hollow plastic tube having a conductive coating on the interior surfaces thereof.

It has been found that best results are achieved when: (a) the metallic particles are silver flakes if the flakes have the following dimensions: a thickness in the range of 15–150 millimicrons and maximum flat surface dimensions in the range of 0.2–30 microns, and (b) the solid content of the binding vehicle of the metallic flake suspension is in the range of 3–25% by weight of the total vehicle. This solid content is the material actually holding the metallic film together after the fluid content of the binding vehicle has evaporated. If the solid content is greater than 25% of the binding vehicle, the individual metallic flakes become coated, thereby reducing physical contact between the flakes, and hence, the conductivity of the film. If the solid content is less than 3% of the binding vehicle, the strength of the film is too low and the metallic flakes tend to dust from the film.

In describing one form of the invention, it will be assumed that it is desired to produce conductive silver films on the inside surfaces of the plurality of hollow square tubes 11 of a multicellular microwave lens of the type designated by the numeral 10 in FIG. 1. The plastic molding material used in forming the lens in this example will be polyester resin. In this process one quadrant, such as quadrant 12, of the lens will be fabricated at one time. After the four quadrants have been fabricated, they will be assembled into a unitary lens. In addition to the hollow tubes 11 forming each lens quadrant, mounting brackets 13 are provided as integral portions during the molding process. Gusset plates 14 are provided for further strengthening the assembled lens. The materials to be used in this process are as follows:

Wax—A hard commercial wax, such as carnauba wax.
Separating agent—by weight:

2% methyl cellulose
49% methylene chloride
49% methyl alcohol

Metallic suspension—the binding vehicle is by weight 88.5% of a first solution, which in turn consists by weight of 13% nitrocellulose, the primary binder, in a solvent of one-half ethyl alcohol and one-half ethyl acetate; 10% of a second solution, which in turn consists by weight of 20% cellulose acetate butyrate, the secondary binder, in a solvent of one-half methyl ethyl ketone and one-half toluene; and 1.5% dioctyl phthalate, a plasticizer. The binding vehicle is mixed in equal parts by weight with silver flakes, which are selected from the dimensional range previously described. As previously pointed out, the solid content of the binding vehicle, that is, the nitrocellulose and the cellulose acetate butyrate, should comprise from 3–25% by weight of the binding vehicle. The relative proportions between the primary and secondary binding materials in the solid content is determined by the desired degree of penetration of the molding material into the metallic film, i.e., the strength of the bond between the film and the molding material. The proportions specified are those presently preferred.

Nylon cloth—type 30 denier, plain tafetta weave, scoured and heat set.

Glass fabric—type ECC, style #125 (warp yarn 450–2/2; filling yarn 450–2/2; mean number of ends in each direction 36 x 34; thickness .005"; 3.93 oz. per sq. yard; plain weave; volan treated). This material is obtainable under the trademark "Fiberglas."

Molding material—polyester resin dispersed in a monomer, such as styrene—by weight 75% polyester resin, 25% styrene. The dispersion includes a catalyst, methyl ethyl ketone, and an accelerator, cobalt naphthenate.

The mold employed comprises a plurality of aluminum mandrels of a type such as mandrel 20, shown in FIG. 2. Each mandrel has a smooth undercut portion 21 the length thereof corresponding to the length of the particular hollow tube 11 which is to be formed about this mandrel. Undercut portion 21 is slightly tapered toward its lower end to facilitate removal from the finished tube.

Figure 3:
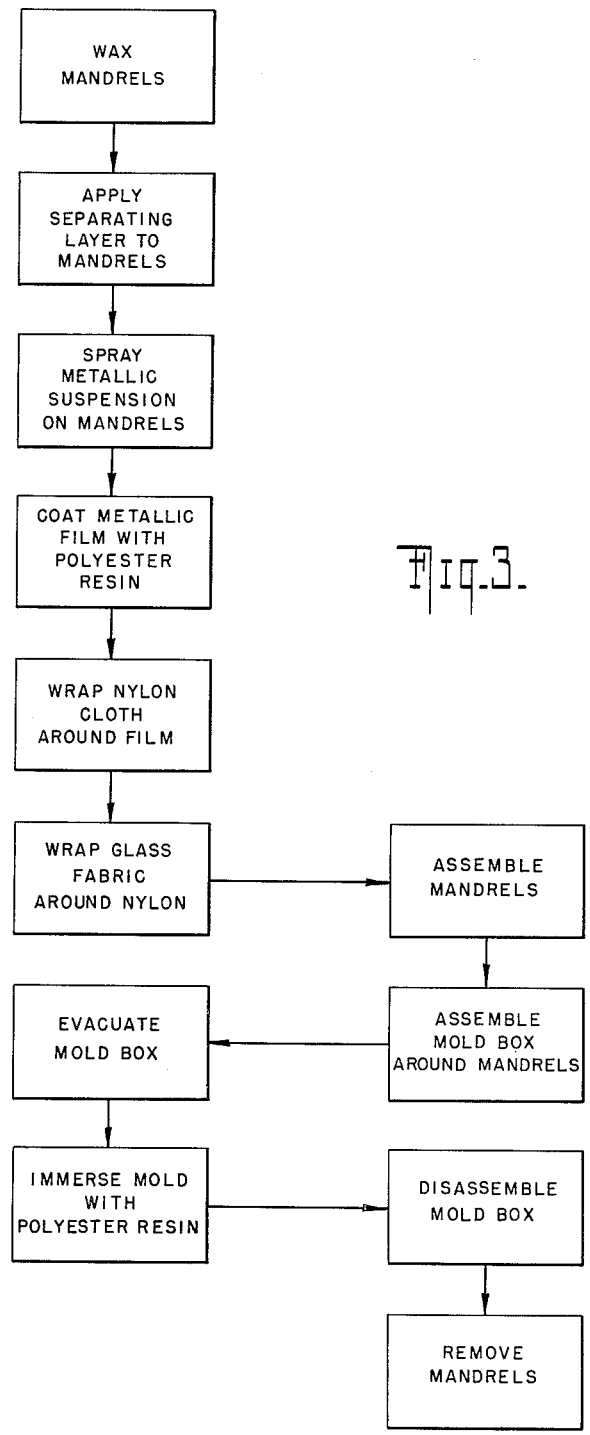
FIG. 3 is a flow chart showing the sequence of the steps employed in the process of this invention.

A coat of paste wax is applied to the mandrel with sanitary tissue, allowed to dry 5 minutes and polished with sanitary tissue. A second coat is then applied and polished. It is the function of the wax to permit easy removal of the mandrel from the final structure. This step is the first in the process, depicted in sequence in FIG. 3.

Two successive layers of separating agent are applied on the waxed surfaces of the mandrel to a total thickness of approximately .0005". The separating agent is allowed to dry. It is the function of the separating layer to serve as a boundary for the metallic suspension which is to be employed next.

Three coats of the metallic suspension are then sprayed onto the undercut portion of the mandrel. Spray pressure is adjusted to apply a total film of .0001" to .0050" thickness uniformly onto the surfaces of the mandrel. The total thickness of the metallic film depends on the frequency of the microwaves to be employed, the lower the frequency, the greater the thickness desired. The resulting coat should be allowed to dry at room temperature for at least 24 hours.

One coat of molding material is then sprayed or brushed onto the metallic film. This protects the film during the subsequent steps of the process. It is this layer of molding material that interacts with the secondary binder to form the aforementioned mechanical bond between the molding material and the metallic film. This application of molding material is termed the overlay.

Two layers of nylon cloth are then wrapped snugly around the metallic film. The two layers of cloth may be held in place with glass fabric string. It is the function of the fine mesh nylon cloth to insure retention of the smooth continuous metallic film during subsequent steps in the process.

Layers 23 of glass fabric to the thickness desired are then wrapped around the nylon layers (FIG. 4). Tie strings 24 of glass fabric may be used to hold the glass fabric layers in place. The various layers on the undercut portion of the mandrel at this time are shown in FIG. 5. It is the function of the high tensile strength glass fabric to strengthen the molded plastic structure.

After all the mandrels which are to be employed in the mold for the quadrant described have been prepared according to the immediately preceding steps, the mold is ready to be assembled. The first mandrel of each row, for example mandrel 30 of FIG. 6, is firmly mounted to a lower guide rail 33 with an alignment tongue portion 34, shown in FIGS. 2 and 4, fitted into a groove 35, shown in FIG. 6. A screw 36 (FIG. 7) firmly affixes mandrel 30 to lower guide rail 33. An upper guide rail 37 is placed in position on top of mandrel 30 and a screw 38 is inserted but not tightened. The second mandrel in the row, mandrel 31, is then slid between the guide rails from their open end by means of the alignment grooves until adjacent wrapped surfaces of mandrels 30 and 31 are in contact. Screws 39 and 40 are inserted through the guide rails into mandrel 31. The remaining mandrels in the row are then slid, one at a time, between the guide rails from the open end, each in turn being affixed with screws until the last mandrel in the row, mandrel 32, has been inserted. A clamp is employed to draw the mandrels together while the screws are tightened. The remaining rows of mandrels are then assembled in the manner previously described.

Side plates 45 and 46 (FIG. 8) are assembled to a base plate 47 of the mold box with screws provided. All inside surfaces of the three asesmbled plates are coated with paste wax and then with separating agent.

The previously sub-assembled mandrel rows are then mounted into the mold box corner in the manner shown in FIG. 8. When all the sub-assembled rows have been placed in the mold box, long bolts 50 are inserted through holes in side plate 46 and are screwed into bosses 51 provided on the top and bottom of selected upper and lower guide rails. Layers 53 of glass fabric to the desired thickness are then laid on the exposed sides of the mandrels, the width of the fabric at each mandrel conforming to the length of the undercut mandrel portions. This fabric may be held in position with strings 54.

A corner mandrel 56 (FIG. 9) is provided with continuous layers 57 of glass fabric to the thickness desired. This fabric is tied in place with glass fabric strings 58. The fabric-wrapped corner mandrel is slid into position between the guide rails, the alignment tongues 59 matching corresponding grooves in upper and lower guide rails (FIG. 10). Further layers of glass fabric 62 are then laid around the outside of the exposed surfaces of the mandrels and corner mandrel 56, the width of the fabric at each mandrel again conforming to the length of the undercut mandrel portions.

Figure 12:
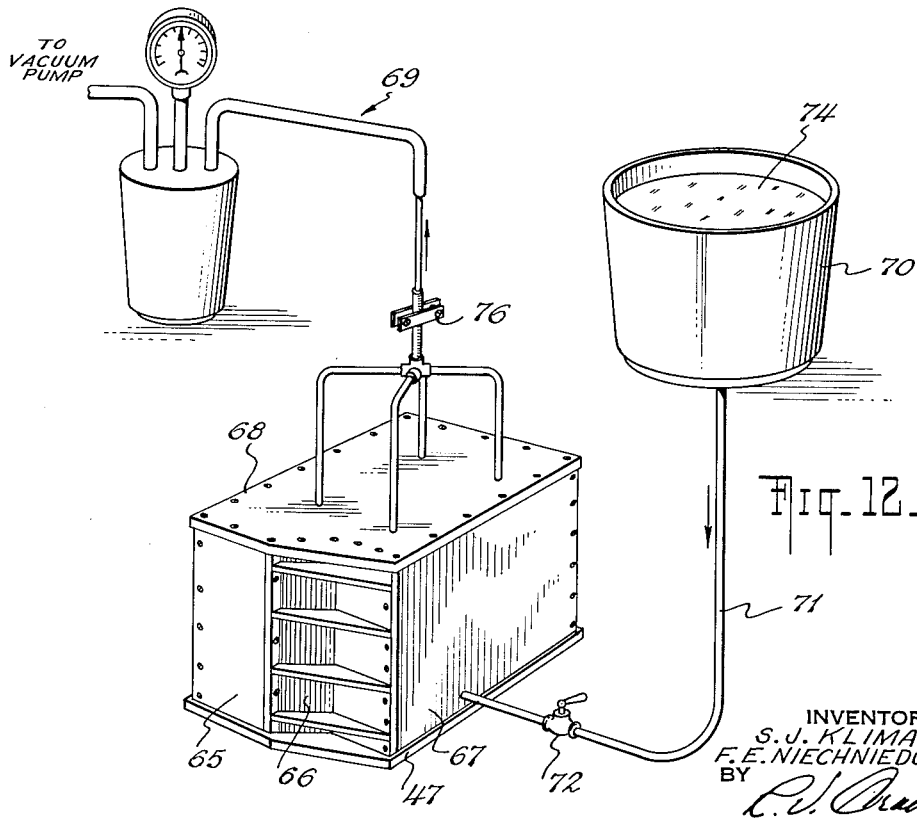
FIG. 12 is a pictorial diagram showing the organization of apparatus employed for immersing the mandrels with the molding material.

Layers of paste wax and separating agent are then applied to the inside surfaces of the remaining side plates 65, 66 and 67 of the mold box. Side plates 65, 66 and 67 are then assembled to the structure of FIG. 10, such as with screws. A top clear plastic cover plate 68 is bolted to the side plates to complete the mold box, as shown in FIGS. 11 and 12. All cracks and joints of the mold box are sealed to prevent leaks. Outlets in the cover plate are then connected to a vacuum system 69. An inlet in side plate 67 is connected to a reservoir 70 by means of a pipe 71 containing therein a valve 72. With valve 72 closed, a vacuum of approximately 8"–10" of mercury is drawn in the mold box.

The polyester resin liquid molding material 74 is mixed in reservoir 70. Vacuum valve 76 is then closed and valve 72 opened, permitting the molding material contents of reservoir 70 to flow into the mold box. The molding material immerses the coated surface of the mandrels. The molding material fills the mold box until it has covered the upper guide rails. A final hardening of approximately 24 hours is required before disassembly of the mold box may begin. This subsequent application of molding material bonds to the previously applied thin layer of molding material, and not directly to the metallic film. Thus, the formerly established bond between molding material and metallic film remains undisturbed. After the mold box has been disassembled, the mandrels are removed from the structure. The separating layer is removed from the inside of tubes 11 by rinsing with water containing a detergent. A 2% glycerine solution would speed removal of the separating layer.

The quadrants must then be joined together. A coating of molding material is applied to each quadrant bonding surface. Glass fabric is then laid against the bonding surface and additional polyester resin applied over the glass fabric. The quadrants are then placed together and pressure applied, 24 hours being allowed for the assembled structure to set.

One coat of molding material is applied to each gusset plate 14 and to the portions of the lens structure where the gusset plates are to be mounted. The gussett plates are then pressed to the structure and allowed to harden under pressure for 24 hours. The lens assembly is now complete.

The overlay application of molding material is employed only to protect the metallic film during later steps in the process, as when the exterior of the film is to be wrapped with fabric. This step may be eliminated when no fabric wrapping is employed. When, however, an overlay is used, it is this overlay molding material that interacts with the secondary binder to form the aforementioned mechanical bond between the molding material and the metallic film. The subsequent application of molding material bonds to the overlay, and not directly to the metallic film.

In the process described above certain modifications are possible without departing from the scope of this invention. It is possible to eliminate the use of the wax or the separating layer, or both, under certain circumstances. For example, a slip agent, such as talcum powder, can be included in the metallic suspension. Where a separating agent is employed, a water soluble film is preferred. Such separating agents are well known in the art and are not limited to the example given. In place of nylon any fine mesh fabric may be employed, such as dacron or rayon. The quantity of Fiberglas cloth is determined by the desired strength of the final product. Instead of glass fabric, which is presently preferred because of its strength, any fabric which is readily wetted by the molding material may be employed. For example, burlap may be used. Although the presently preferred method of placing the layers of nylon and glass fabric adjacent the undercut portions of the individual mandrels is to wrap the material about the mandrels, sleeves or tubes of material may be drawn over one end of the respective mandrels. Where individual waveguides or other simple structures are to be formed no fabric of any type need be employed for reinforcement. The composition of the polyester resin is determined by the viscosity desired during the molding process. The more styrene that is employed the less viscous is the fluid. Other commercial catalysts and accelerators may be employed with the polyester resin.

The step of brushing may be substituted for any or all the steps of spraying specified above. Furthermore, if a single cell type of structure, such as a waveguide is being formed, the molding material may be brushed on the mandrel to the thickness desired, rather than applied by the vacuum molding technique described.

A metallic film bonded to the surfaces of a plastic structure, as described in this invention, will not chip or flake off, is resistive to wear, and has excellent conductive properties for microwaves. The process described is not limited to the application of metallic films to interior surfaces of hollow structures but may be employed, as well, to apply metallic films to exterior surfaces of plastic structures.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. The process of manufacturing at least a sector of a metalized plastic multicellular microwave lens comprising the steps of coating the smooth surfaces of a plurality of mandrels with a suspension of thin metallic flakes in a binding vehicle, wherein the flat surfaces of the flakes become aligned substantially parallel with the adjacent smooth surfaces of the mandrels, each mandrel conforming in cross section to the interior shape of a particular lens cell, the lengths of said smooth mandrel surfaces being equal to the lengths of the corresponding lens cells, said binding vehicle containing a binding material and a solvent adapted to evaporate whereby after evaporation of said solvent said flakes and binding material form continuous metallic films conformal with the smooth surfaces of each mandrel, covering the coated surfaces of each mandrel with a thin layer of fluid plastic molding material after evaporation of said solvent, said fluid molding material being adapted to harden substantially void free by polymerization and to adhere to the outside of said metallic films, placing fabric adjacent said thin layer on each mandrel after the thin layers have hardened, assembling the mandrels in a molding box in accordance with the desired design of the lens, filling the interior of said molding box to a predetermined level at least above the top of the highest smooth mandrel surface with additional fluid plastic molding material, disassembling said molding box after said additional molding material has hardened, and withdrawing the mandrel from the interior of each lens cell.

2. The process of manufacturing at least a sector of a metalized plastic multicellular microwave lens comprising the steps of coating the smooth surfaces of a plurality of mandrels with a suspension of thin metallic flakes in a binding vehicle, wherein the flat surfaces of the flakes become aligned substantially parallel with the adjacent smooth surfaces of the mandrels, each mandrel conforming in cross section to the interior shape of a particular lens cell, the lengths of said smooth mandrel surfaces being equal to the lengths of a corresponding lens cell, said binding vehicle containing a binding material and a solvent adapted to evaporate whereby after evaporation of said solvent said flakes and binding material form continuous metallic films conformal with the smooth surfaces of each mandrel, assembling the mandrels in a molding box in accordance with the desired design of the lens, filling the interior of said molding box to a predetermined level at least above the top of the highest smooth mandrel surface with fluid plastic molding material, said molding material being adapted to harden substantially void free by polymerization and to adhere to the outside of said metallic films, disassembling said molding box after said molding material has hardened, and withdrawing the mandrel from the interior of each lens cell.

References Cited in the file of this patent

UNITED STATES PATENTS

| Number | Name | Date |
|---|---|---|
| 2,029,048 | Atwood | Jan. 28, 1936 |
| 2,287,053 | Murphy | June 23, 1942 |
| 2,335,760 | Hucks | Nov. 30, 1943 |
| 2,341,499 | Cunningham | Feb. 8, 1944 |
| 2,400,482 | Brannon et al. | May 21, 1946 |
| 2,445,290 | Gonda | July 13, 1948 |
| 2,454,910 | Carr | Nov. 30, 1948 |
| 2,477,852 | Bacon | Aug. 2, 1949 |
| 2,495,640 | Muskat | Jan. 24, 1950 |
| 2,528,582 | De Vore | Nov. 7, 1950 |
| 2,531,541 | Spicer | Nov. 28, 1950 |
| 2,576,463 | Kock | Nov. 27, 1951 |
| 2,638,428 | Gordon et al. | May 12, 1953 |
| 2,695,256 | De Olloqui et al. | Nov. 23, 1954 |
| 2,706,832 | Frost et al. | Apr. 26, 1955 |
| 2,755,216 | Lemons | July 17, 1956 |
| 2,765,248 | Beech et al. | Oct. 2, 1956 |
| 2,768,133 | Lundbye | Oct. 23, 1956 |
| 2,826,524 | Molloy | Mar. 11, 1958 |
| 2,840,811 | McMillan | June 24, 1958 |
| 2,870,524 | Kinnear | Jan. 27, 1959 |